(12) United States Patent
Rahimi et al.

(10) Patent No.: US 10,759,192 B2
(45) Date of Patent: *Sep. 1, 2020

(54) PRE-TREATMENT FIXING FLUID

(71) Applicant: HEWLETT-PACKARD DEVELOPMENT COMPANY, L.P., Houston, TX (US)

(72) Inventors: Alireza Rahimi, San Diego, CA (US); George Sarkisian, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/092,718

(22) PCT Filed: Jul. 20, 2016

(86) PCT No.: PCT/US2016/043156
§ 371 (c)(1),
(2) Date: Oct. 10, 2018

(87) PCT Pub. No.: WO2018/017076
PCT Pub. Date: Jan. 25, 2018

(65) Prior Publication Data
US 2019/0161635 A1    May 30, 2019

(51) Int. Cl.
*B41J 11/00* (2006.01)
*C09D 11/033* (2014.01)
(Continued)

(52) U.S. Cl.
CPC .......... *B41J 11/0015* (2013.01); *B41J 2/2114* (2013.01); *B41L 23/00* (2013.01);
(Continued)

(58) Field of Classification Search
CPC .......... B65H 23/26; B65H 2404/14211; B41J 3/4078; B41J 11/002; B41J 29/377;
(Continued)

(56) References Cited

U.S. PATENT DOCUMENTS 4,204,051 A    5/1980    Wellner et al.
5,700,851 A    12/1997   Banning
(Continued)

FOREIGN PATENT DOCUMENTS

CN    101590726    12/2009
CN    102884145    1/2013
(Continued)

OTHER PUBLICATIONS

International Search Report and Written Opinion for International Application No. PCT/US2016/043156 dated Apr. 6, 2017, 7 pages.

(Continued)

*Primary Examiner* — Manish S Shah
(74) *Attorney, Agent, or Firm* — HP Inc. Patent Department

(57) ABSTRACT

A pre-treatment fixing fluid for an offset coated medium is disclosed. The pre-treatment fixing fluid includes calcium-containing cationic crashing agents consisting of calcium propionate and calcium nitrate, wherein the calcium propionate is present in an amount ranging from about 0 wt % to about 10 wt %, and wherein the calcium nitrate is present in an amount ranging from about 15 wt % to 0 wt %, both based on the total wt % of the pre-treatment fixing fluid. The pre-treatment fixing further includes a co-solvent, a surfactant, and a balance of water. The surfactant is selected from the group consisting of a first surfactant having a first hydrophilic lipophilic balance (HLB) value within a hydrophobic range and a combination of the first surfactant and a second surfactant having a second HLB value within a water dispersible range.

17 Claims, 4 Drawing Sheets

(51) Int. Cl.
| | |
|---|---|
| D21H 17/66 | (2006.01) |
| D21H 19/10 | (2006.01) |
| B41L 23/00 | (2006.01) |
| D21H 21/24 | (2006.01) |
| D21H 21/10 | (2006.01) |
| B41M 5/00 | (2006.01) |
| B41J 2/21 | (2006.01) |
| C09D 11/38 | (2014.01) |
| C09D 11/54 | (2014.01) |
| D21H 19/14 | (2006.01) |
| D21H 19/82 | (2006.01) |
| B41M 5/52 | (2006.01) |

(52) U.S. Cl.
CPC ......... *B41M 5/0017* (2013.01); *C09D 11/033* (2013.01); *C09D 11/38* (2013.01); *C09D 11/54* (2013.01); *D21H 17/66* (2013.01); *D21H 19/10* (2013.01); *D21H 19/14* (2013.01); *D21H 19/828* (2013.01); *D21H 21/10* (2013.01); *D21H 21/24* (2013.01); *B41M 5/5227* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 2/161; B41J 2/1623; B41J 2202/00; B41J 2202/03; B41J 2/14201; B41J 2/045; B41M 5/0047; B41M 5/0011; B41M 5/0017; B41M 7/00; B41M 7/0072; B41M 5/52; B41M 5/5218; D06P 5/001; D06B 19/0076
See application file for complete search history.

(56) References Cited

U.S. PATENT DOCUMENTS

| | | | |
|---|---|---|---|
| 5,785,743 | A | 7/1998 | Adamic et al. |
| 5,889,083 | A | 3/1999 | Zhu |
| 6,136,890 | A | 10/2000 | Carlson et al. |
| 7,429,293 | B2 | 9/2008 | Cai |
| 8,008,391 | B2 | 8/2011 | Enomoto et al. |
| 8,025,384 | B2 | 9/2011 | Ogasawara et al. |
| 8,556,402 | B2 | 10/2013 | Li |
| 8,974,049 | B2 | 3/2015 | Prasad et al. |
| 9,090,734 | B2 | 7/2015 | Kraiter et al. |
| 9,296,910 | B2 | 3/2016 | Brown et al. |
| 2005/0039634 | A1 | 2/2005 | Hermansky |
| 2007/0021290 | A1 | 1/2007 | Gromelski et al. |
| 2007/0219290 | A1* | 9/2007 | Sarkisian ............... C09D 11/30 523/160 |
| 2007/0282037 | A1 | 12/2007 | Anderson et al. |
| 2008/0022887 | A1 | 1/2008 | Tanoue |
| 2008/0138530 | A1 | 6/2008 | Lin |
| 2008/0146691 | A1 | 6/2008 | Kruger et al. |
| 2008/0257203 | A1 | 10/2008 | Choy et al. |
| 2009/0071366 | A1 | 3/2009 | Akers, Jr. et al. |
| 2009/0185019 | A1* | 7/2009 | Ogasawara ............ B41J 2/2114 347/100 |
| 2009/0239996 | A1 | 9/2009 | Saito |
| 2010/0047456 | A1 | 2/2010 | Kariya |
| 2010/0201768 | A1 | 8/2010 | Udagawa |
| 2011/0032303 | A1 | 2/2011 | Li |
| 2011/0164086 | A1* | 7/2011 | Ggoto ................. B41M 5/0017 347/21 |
| 2011/0281988 | A1 | 11/2011 | Tanoue |
| 2012/0035317 | A1 | 2/2012 | Roberts et al. |
| 2013/0083117 | A1 | 4/2013 | Ohmoto |
| 2013/0108809 | A1 | 5/2013 | Noguchi et al. |
| 2013/0201252 | A1* | 8/2013 | Namba ................ B41J 11/0015 347/21 |
| 2013/0209708 | A1 | 8/2013 | Gane et al. |
| 2013/0253130 | A1 | 9/2013 | Berge |
| 2013/0266776 | A1 | 10/2013 | Matsuoka et al. |
| 2013/0267656 | A1 | 10/2013 | Berge |
| 2013/0307914 | A1* | 11/2013 | Chen .................... B41J 2/2114 347/100 |
| 2013/0328973 | A1 | 12/2013 | Kakikawa |
| 2014/0037913 | A1 | 2/2014 | Nagahama et al. |
| 2014/0055520 | A1 | 2/2014 | Inumaru et al. |
| 2014/0192112 | A1* | 7/2014 | Nagashima ............... B41J 2/01 347/21 |
| 2014/0364548 | A1 | 12/2014 | Everhardus et al. |
| 2016/0215157 | A1 | 7/2016 | Kakikawa |
| 2017/0037269 | A1 | 2/2017 | Isobe |
| 2017/0183522 | A1 | 6/2017 | Chaffins |

FOREIGN PATENT DOCUMENTS

| | | |
|---|---|---|
| CN | 104662108 | 5/2015 |
| JP | H0625377 | 2/1994 |
| JP | 2009233486 | 10/2009 |
| JP | 2012201730 | 10/2012 |
| RU | 2264493 | 11/2005 |
| SU | 482433 | 5/1976 |
| WO | WO 0194480 | 12/2001 |
| WO | WO 2007112244 | 10/2007 |
| WO | WO 2012105949 | 8/2012 |
| WO | WO 2015023274 | 2/2015 |
| WO | WO 2015041702 | 3/2015 |
| WO | WO 2015112115 | 7/2015 |
| WO | WO 2015116028 | 8/2015 |
| WO | WO 2015116029 | 8/2015 |
| WO | WO 2015116030 | 8/2015 |
| WO | WO 2015130498 | 9/2015 |
| WO | WO-2015187143 | 12/2015 |
| WO | WO 2016018306 | 2/2016 |
| WO | WO 2016030452 | 3/2016 |
| WO | WO 2016030454 | 3/2016 |
| WO | WO-2016068985 | 5/2016 |
| WO | WO-2016122563 | 8/2016 |
| WO | WO-2016122566 | 8/2016 |
| WO | WO 2016122569 | 8/2016 |
| WO | WO-2017074349 | 5/2017 |
| WO | WO 2018156156 | 8/2018 |
| WO | WO 2018182568 | 10/2018 |
| WO | WO 2018190806 | 10/2018 |

OTHER PUBLICATIONS

"Definition of compound"—Chemistry Dictionary, 2017, 4 pages.
Nelson, Daniel, "Amino Group: Definition and Examples", Scien Trends, May 16, 2019, 3 pages.
"Alkyl groups", IUPAC Gold Book, 2008, 1 page.

* cited by examiner

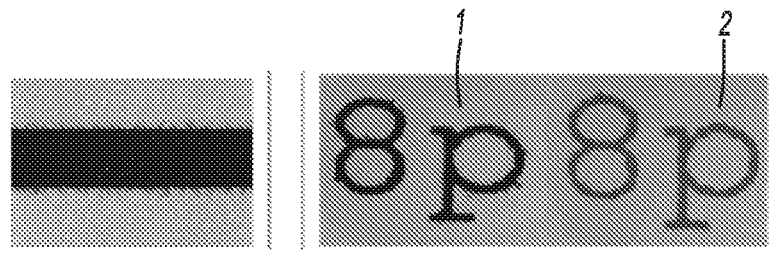
*Fig-3A*      *Fig-3B*
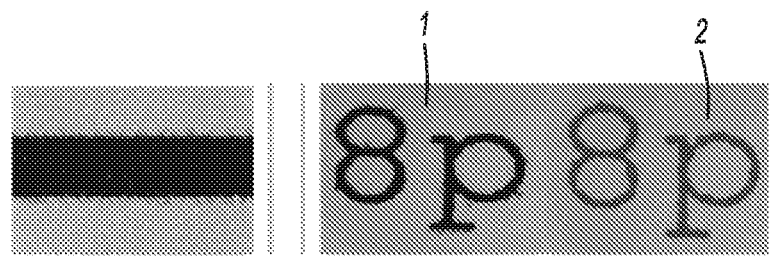
*Fig-4A*      *Fig-4B*
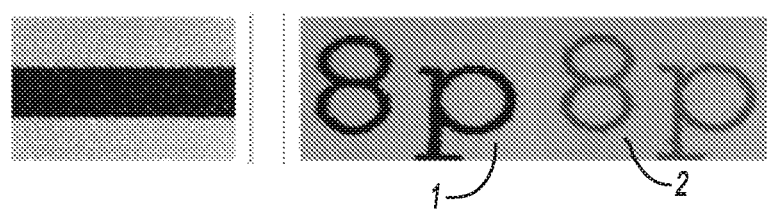
*Fig-5A*      *Fig-5B*
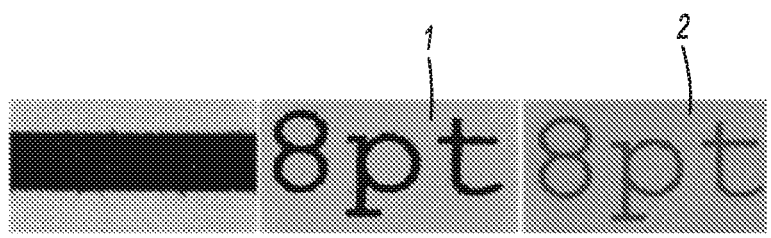
*Fig-6A*      *Fig-6B*

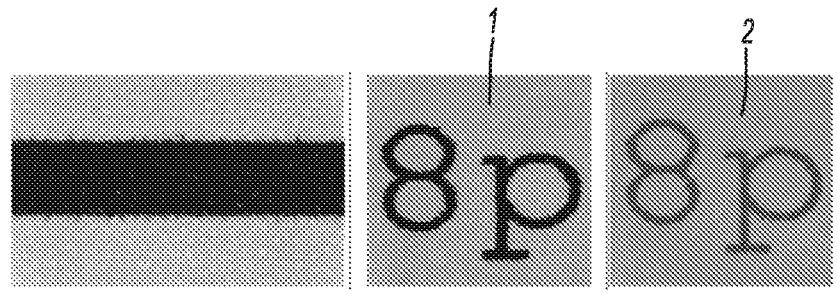
*Fig-7A*  *Fig-7B*
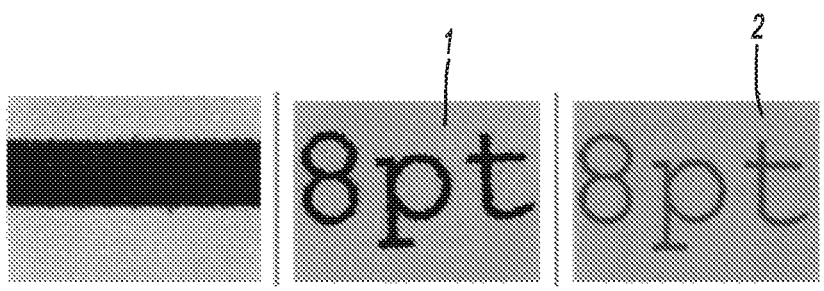
*Fig-8A*  *Fig-8B*
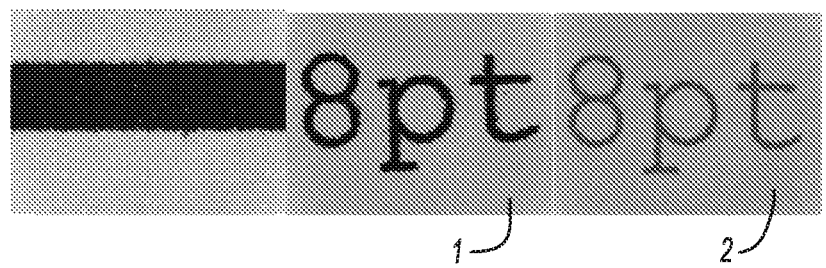
*Fig-9A*  *Fig-9B*

PRE-TREATMENT FIXING FLUID

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 3A and 3B are, respectively, a black and white image illustrating bleed control and a black and white image illustrating print quality for prints formed using a first example of a comparative pre-treatment fixing coating;

FIGS. 4A and 4B are, respectively, a black and white image illustrating bleed control and a black and white image illustrating print quality for prints formed using a second example of a comparative pre-treatment fixing coating;

FIGS. 5A and 5B are, respectively, a black and white image illustrating bleed control and a black and white image illustrating print quality for prints formed using a third example of a comparative pre-treatment fixing coating;

FIGS. 6A and 6B are, respectively, a black and white image illustrating bleed control and a black and white image illustrating print quality for prints formed using a fourth example of a comparative pre-treatment fixing coating;

FIGS. 7A and 7B are, respectively, a black and white image illustrating bleed control and a black and white image illustrating print quality for prints formed using a fifth example of a comparative pre-treatment fixing coating;

FIGS. 8A and 8B are, respectively, a black and white image illustrating bleed control and a black and white image illustrating print quality for prints formed using a first example of a pre-treatment fixing coating disclosed herein;

FIGS. 9A and 9B are, respectively, a black and white image illustrating bleed control and a black and white image illustrating print quality for prints formed using a second example of a pre-treatment fixing coating disclosed herein.

DETAILED DESCRIPTION

Figure 1:
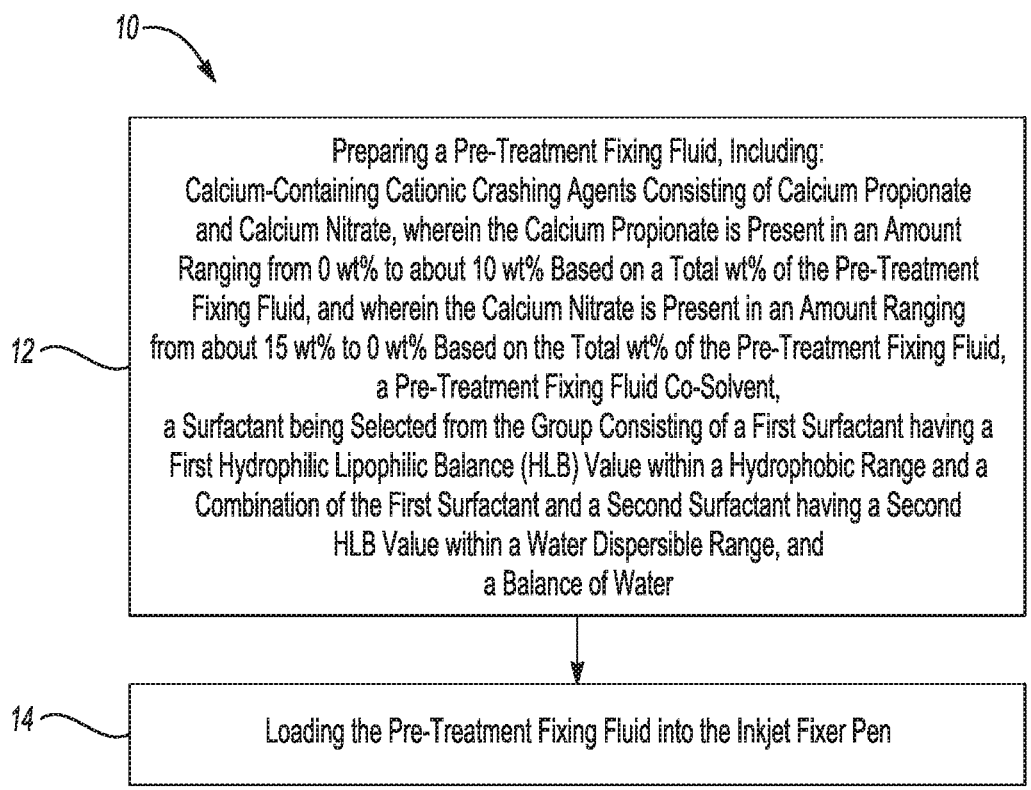
FIG. 1 is a flow diagram of a method for improving uncapped start up performance of an inkjet fixer pen, according to an example.

In inkjet printing, aqueous-based inks are commonly used on uncoated media, in part because the high surface energy of the aqueous ink enables the ink to spread well on the uncoated media. Aqueous inks may also be desirable for printing on coated offset media. However, coated offset media may be a slow-absorbing medium with high hold-out (i.e., colorants tend to remain on the surface of the media). Additionally, coated offset media may have a relatively low surface energy, and the higher surface energy aqueous inks may not spread well. As a result, images formed from aqueous inks on coated offset media tend to have reduced image quality attributes, such as, for example, gloss or optical density.

For recently-developed industrial printers, such as HP PageWide C500 Press and others, control of bleed and coalescence and avoiding text feathering at high speed can be challenging, especially when printing on coated offset media, which may not be suitable for rapid aqueous ink absorption. As used herein, high speed may refer to print speeds of at least 50 feet per minute (fpm), and up to 1000 fpm.

In theory, pre-treatment fixing compositions may render coated offset media more suitable for printing with aqueous-based inks. Pre-treatment fixing compositions are often substantially colorless liquids that interact with the colorant and/or with polymeric components of the ink composition in order to precipitate (i.e., crash) the colorants or otherwise fix the ink composition to the print media surface. Pre-treatment fixing fluid compositions have been applied on the coated offset media before the application of an ink composition in view of improving printing characteristics and attributes of the image. Some pre-treatment fixing fluid compositions have been applied to coated offset media and dried prior to subsequent ink application. This forms a dried ink-receiving type of layer on the surface of the medium. While this may desirably control bleed, the gloss of the resulting print often may suffer.

For high speed inkjet printing, wet-on-wet printing (i.e., wet ink deposited on wet pre-treatment fixing fluid) may be desirable, for example, so that in-line printing can be performed. Wet-on-wet printing could also enable the use of commercially-available coated offset media which does not include any pre-treatment fixing composition thereon, and thus may otherwise be undesirable for high speed inkjet printing. Without a pre-treatment fixing composition for slow-absorbing print media (i.e., coated offset media), there is no control of pigment migration, and the result is color bleed and feathering of text. Wet-on-wet printing would provide the pre-treatment fixing composition in-line rather than as a dried coating composition. The chemistry involved in wet-on-wet printing is complex, due in part to the interaction between the medium and the pre-treatment fixing fluid composition, and between the pre-treatment fixing fluid composition and the ink. In addition, for wet-on-wet printing, the slow-absorbing nature of coated offset media requires the pre-treatment fixing fluid composition to be highly (i.e., immediately) reactive with subsequently deposited inks in order to control bleed and pigment floatation (i.e., dot gain). The desired reactivity may be accomplished by increasing the organic acid salt content; however, it has been found that a higher salt content can lead to pen reliability issues resulting from corrosion and to the formation of prints with poor durability.

Although many pre-treatment fixing formulations have been based primarily on divalent metallic salts, salts containing calcium cations have been found to be particularly suitable fixing agents. Often, pre-treatment fixing formulations include calcium propionate, calcium (B5) pantothenate, and calcium nitrate in combination with co-solvent and surfactant in an aqueous vehicle. However, such pre-treatment fixing formulations may have undesirable uncapped life or performance, which refers to the ability of the pre-treatment fixing formulation to readily eject from the pen, upon prolonged exposure to air. Similarly, the pen used to eject the pre-treatment fixing formulation may have an unacceptable uncapped start up performance (or recovery), which refers to the ability of the pen to readily eject the fluid therefrom after prolonged exposure to air.

The uncapped time may be measured as the amount of time that the pen (in a printhead) may be left uncapped (i.e., exposed to air) before the printer nozzles no longer fire properly, potentially because of clogging, plugging, or retraction of solid(s) in the fluid from the drop forming region of the nozzle/firing chamber. In other words, the uncapped time for a thermal inkjet pen may be the length of time that the pen can remain unused and uncapped before spitting (one example of pen servicing) would be required to form an acceptable quality drop. A decreased uncapped time can lead to poor print reliability. In some examples, it is desired for the uncapped time to be from about five minutes to about ten minutes. In other examples, it is desired for the uncapped time to exceed six minutes, especially in the newer, high speed, industrial printers.

In accordance with the teachings herein, a pre-treatment fixing fluid for an offset coated medium is provided. The pre-treatment fixing fluid includes a particular cationic crashing agent or a combination of particular cationic crashing agents to prevent ink pigment migration (which leads to better image quality) and to facilitate fast drying. It has been found that high levels of cationic crashing agents (e.g., metal salts) often used in pre-treatment fixing fluids to achieve the desired image and text quality has caused pen nozzle health problems, such as poor uncapped start up performance. In the examples disclosed herein, a pre-treatment fixing fluid has been developed that includes a high percentage of the particular cationic crashing agent(s) and that improves fixer pen start up from an uncapped position (i.e., uncapped start up performance). In other words, the fixer pens dispensing the pre-treatment fixing fluid disclosed herein exhibit significantly better recovery and reliability.

The pre-treatment fixing fluid may have a composition including: calcium-containing cationic crashing agents consisting of calcium propionate and/or calcium nitrate; a co-solvent; one or more surfactants, with a first surfactant having a first hydrophilic lipophilic balance (HLB) value within a hydrophobic range used alone or in combination with a second surfactant having a second HLB value within a water dispersible range; and water. The pre-treatment fixing fluid is devoid of calcium pantothenate.

Removing the calcium pantothenate salt from the pre-treatment fixing fluid may have a significant effect on pen recovery. The calcium pantothenate may be replaced with additional calcium nitrate to maintain the same molar concentration of calcium ions. The calcium propionate may be present in an amount ranging from 0 weight percent (wt %) to about 10 wt % based on a total wt % of the pre-treatment fixing fluid, while the calcium nitrate may be present in an amount ranging from about 15 wt % to 0 wt % based on the total wt % of the pre-treatment fixing fluid. Furthermore, these two calcium salts can be used individually and the result is almost the same as the combination. If one of the two calcium salts is 0 wt %, the other of the calcium salts can be at its maximum weight percent.

As mentioned above, the pre-treatment fixing fluid includes a first surfactant having a first hydrophilic lipophilic balance (HLB) value within a hydrophobic range, which is used alone or in combination with a second surfactant having a second HLB value within a water dispersible range. The surfactant(s) may be present for wetting and penetrating the print medium. In the ideal case, the surfactant(s) spread uniformly on the print medium. As such, in some examples, using the surfactant having an HLB value within a water dispersible range (i.e., a high HLB surfactant) helps a low HLB surfactant (i.e., having an HLB value within a hydrophobic range), such as SURFYNOL® SE-F, stay in the pre-treatment fixing fluid and perform as a strong dynamic surfactant. As used herein, a "strong dynamic surfactant" is one that wets the medium vertically and laterally, and the dot gain is big. In contrast, a non-dynamic surfactant lowers the surface tension and moves vertically, and the dot gain is small. SURFYNOL® SE-F is an ethoxylated acetylenic diol, such as ethoxylated 2,4,7,9-tetramethyl-5-decyne-4,7-diol, and has an HLB of 4-5. Examples of hydrophobic surfactants, in addition to SURFYNOL® SE-F, include SURFYNOL® 104, PLURONIC® L61 and 25R2, and DYNOL® 960, 800, and 360.

Examples of surfactants having an HLB value within a water dispersible range include SURFYNOL® CT-211, which is an alkylphenylethoxylate, such as poly(oxy-1,2-ethanediyl), α-(nonylphenyl)-ω-hydroxy-, branched plus 2,4,7,9-tetramethyl-5-decyne-4,7-diol, having an HLB value of 8-12, and CARBOWET® GA-211, which may be similar to SURFYNOL® CT-211, SURFYNOL® 465 and CT-121, TERGITOL® 15s5, 15s7, TMN-3, and TMN-6, PLURONIC® 123 and 17R4, and DYNOL® 604 and 607.

The surfactant having the lower HLB value (less than about 6) may be present in an amount ranging from about 0.05 wt % to about 1.5 wt % based on the total wt % of the inkjet ink. The surfactant having the higher HLB value (greater than 6) may be present in an amount ranging from 0 wt % to about 0.1 wt % based on the total wt % of the pre-treatment fixing fluid. In some cases, the surfactant with the higher HLB value may not be needed at lower concentrations of the surfactant having the lower HLB value. For example, when using SURFYNOL® SE-F at low concentrations (i.e., up to about 0.09 wt %), CARBOWET® GA-211 may not be needed, since SURFYNOL® SE-F is soluble at low concentrations. On the other hand, at higher concentrations of the surfactant having the lower HLB value (e.g., SURFYNOL® SE-F), then the surfactant having the higher HLB value (e.g., CARBOWET® GA-211) may be needed to help with the solubility of the surfactant having the lower HLB value.

The co-solvent may be an organic co-solvent, such as aliphatic alcohols, aromatic alcohols, diols, glycol ethers, polyglycol ethers, 2-pyrrolidinones, caprolactams, formamides, acetamides, glycols, and long chain alcohols. However, glycols have generally been found to be superior for uncapped start up performance (or recovery), particularly tetraethylene glycol. The co-solvent may be present in total in the pre-treatment fixing fluid in an amount ranging from about 2 wt % to about 20 wt % depending, at least in part, on the jetting architecture of the system used to print the pre-treatment fixing fluid. In an example, the co-solvent is present in the pre-treatment fixing fluid in an amount of about 12 wt % based on the total wt % of the pre-treatment fixing fluid.

The balance of the pre-treatment fixing fluid may be water.

The pre-treatment fixing fluid may also include an acid present in an amount sufficient to render a pH of the pre-treatment fixing fluid from about 4.0 to 7.0. An example of a suitable acid for adjusting the pH is methanesulfonic acid.

It is to be understood that the pre-treatment fixing fluid excludes any latex polymer.

FIG. 1 depicts a flow chart of an example of a method 10 for improving uncapped start up performance of an inkjet fixer pen, according to an example. In the method 10, an example of the pre-treatment fixing fluid is prepared (reference numeral 12). The example pre-treatment fixing fluid includes:

calcium-containing cationic crashing agents consisting of calcium propionate and calcium nitrate, wherein the calcium propionate is present in an amount ranging from 0 wt % to about 10 wt % based on a total wt % of the pre-treatment fixing fluid, and wherein the calcium nitrate is present in an amount ranging from about 15 wt % to 0 wt % based on the total wt % of the pre-treatment fixing fluid;

a pre-treatment fixing fluid co-solvent;

a surfactant being selected from the group consisting of a first surfactant having a first hydrophilic lipophilic balance (HLB) value within a hydrophobic range and a combination of the first surfactant and a second surfactant having a second HLB value within a water dispersible range; and a balance of water.

The method 10 may further include loading the pre-treatment fixing fluid into the inkjet fixer pen (reference numeral 14).

While not shown in FIG. 1, the method 10 may also include allowing the inkjet fixer pen to remain uncapped for a time ranging from about 5 minutes to about 10 minutes. After the time has passed and without servicing the inkjet fixer pen, the method 10 further includes ejecting at least some of the pre-treatment fixing fluid from the inkjet fixer pen. At this time, the nozzles of the pen can fire properly, and the pen can easily resume printing of the pre-treatment fixing fluid.

Other examples of the method 10 may proceed without allowing the inkjet fixer pen to remain uncapped for the time period.

The printing of the pre-treatment fixing fluid may be accomplished using a high speed printing apparatus at print speeds of at least 50 fpm, and up to 1000 fpm. Examples of suitable high speed printing apparatuses include thermal inkjet printers or web presses, piezoelectric inkjet printers or web presses, or continuous inkjet printers or web presses. The pre-treatment fixing fluid may be printed directly onto a surface of coated offset medium. The pre-treatment fixing fluid may be the composition disclosed above.

In this example of the printing method 10, no drying operation is performed after the pre-treatment fixing fluid is applied on the medium. Rather, while the pre-treatment fixing fluid is wet, an inkjet ink is deposited on the medium with the pre-treatment fixing fluid thereon. In other words, after the pre-treatment fixing fluid is applied to the medium, the inkjet ink may be applied to the wet pre-treatment fixing fluid coated on the medium. When multiple ink colors are used, it is to be understood that all of the inks are applied while previously deposited layers are still wet.

The ink may be applied onto the pre-treatment fixing fluid using the same suitable high speed inkjet printing apparatus disclosed herein for the pre-treatment fixing fluid application. The ink composition may include:

a pigment;

a binder that is a polyurethane-based dispersion;

a co-solvent;

a surfactant; and a balance of water.

The ink may further include other components common to inkjet inks, such as antimicrobial agents (e.g., biocides and fungicides), anti-kogation agents (for thermal inkjet printing), etc. For some examples of printing, the ink may be chosen from a pigment-based inkjet ink, a pigmented latex-based inkjet ink, a UV curable inkjet ink, a dye-based inkjet ink, or a toner. The ink may be any color, such as black, cyan, magenta, yellow, etc.

In a particular example, the ink may contain two or more surfactants, a first surfactant having a first hydrophilic lipophilic balance (HLB) value either within a water dispersible range or within a hydrophobic range, and a second surfactant having a second HLB value within a hydrophobic range. The combination of the first surfactant and the second surfactant is to adjust a surface tension of the inkjet ink to a value lower than a surface tension of the offset coated medium on which the inkjet ink is to be printed.

In the examples disclosed herein, an example coated offset medium may include: a print medium coated with a coating that contains a hydrophobic polymer and forms a nonporous smooth surface; and an example pre-treatment fixing coating (formed from an example pre-treatment fixing fluid disclosed herein) on the nonporous smooth surface of the print medium.

An example of the hydrophobic polymer is styrene butadiene. As used herein, a "smooth" surface is one that is substantially uniform and essentially non-porous.

In an example, the print medium may be a commercially available coated medium, such as STERLING® Ultra Gloss (NewPage Corp.) and UTOPIA™ Digital (Appleton Coated LLC). The coated offset media may further include the ink described above printed on the pre-treatment fixing coating. The coating of the pre-treatment fixing fluid may be a wet coating upon which the ink is applied.

To further illustrate the present disclosure, examples are given herein. It is to be understood that these examples are provided for illustrative purposes and are not to be construed as limiting the scope of the present disclosure.

EXAMPLES

Examples 1-7

A number of example and comparative ("comp") example pre-treatment fixing fluid compositions were prepared, as listed in Table I below. Most included calcium propionate ("Ca Pro.") and calcium nitrate (with $4H_2O$). Some compositions included calcium pantothenate ("Ca Pan.") as well. The compositions including Ca Pan are comparative examples. Comparative pre-treatment fixing fluids with calcium pantothenate have not shown the necessary decap/uncapped performance required for high speed printing. Examples of the pre-treatment fixing fluid compositions as disclosed herein do not include calcium pantothenate.

Some of the pre-treatment fixing fluids had one surfactant, while other compositions included two surfactants. In the one surfactant case, the surfactant was SURFYNOL® SE-F ("SE-F"), an ethoxylated acetylenic diol available from Air Products and Chemicals, Inc. (Allentown, Pa.). The compositions with two surfactants included a first surfactant having a first HLB value within a hydrophobic range and a second surfactant having a second HLB value within a water dispersible range. The first surfactant was SURFYNOL® SE-F (HLB=4-5), while the second surfactant was CARBOWET® GA 211 ("GA 211") (HLB=8-12), also available from Air Products.

The co-solvent was either glycerol ("Gly"), tetraethylene glycol ("4EG") or DANTOCOL® DHE ("Dant"). DANTOCOL® DHE is di-(2-hydoxyethyl)-5, 5-dimethylhydantoin, available from Lonza Inc. (Allendale, N.J.).

Two antimicrobial agents were employed. In some examples, PROXEL™ GXL ("GXL"), an antimicrobial containing 1,2-benzisothiazolin-3-one in a 20% aqueous dipropylene glycol solution, available from Arch Chemicals, Inc. (Norwalk, Conn.), and ACTICIDE® B20 ("B20"), a biocide containing 1,2-benzisothiazol-3(2H)-one, available from Thor Specialties, Inc. (Trumbull, Conn.), were employed. In other examples, ACTICIDE® M20 ("M20"), a biocide containing 2-methylisothiazol-3(2H)-one and 1,2-benzisothiazol-3(2H)-one, available from Thor Specialties, Inc., and ACTICIDE® B20 were used.

In all cases, the balance of the composition was water. The pH of all compositions was adjusted to 6.6 with methanesulfonic acid. The wt % listed for a component is based on the total wt % of the pre-treatment fixing fluid.

a hydrophobic range and a second surfactant having a second HLB value either within a water dispersible range. These two compositions are considered to be within the scope of the teachings.

Comparative Examples 8 and 9 were similar to Example 6, except that different co-solvents were utilized to evaluate the effect of the co-solvent. More particularly, Comparative Examples 1, 2 and 8 used glycerol as the co-solvent, Comparative Examples 3-5 and Examples 6 and 7 used tetraethylene glycol as the co-solvent, and Comparative Example 9 used DANTOCOL® DHE as the co-solvent.

To test the fixer pens recovery/start up, all pre-treatment fixing fluids were tinted with a red dye for visibility. To check the text quality, bleed and coalescence control, all pre-treatment fixing fluids were printed with black and cyan inks.

Figure 2:
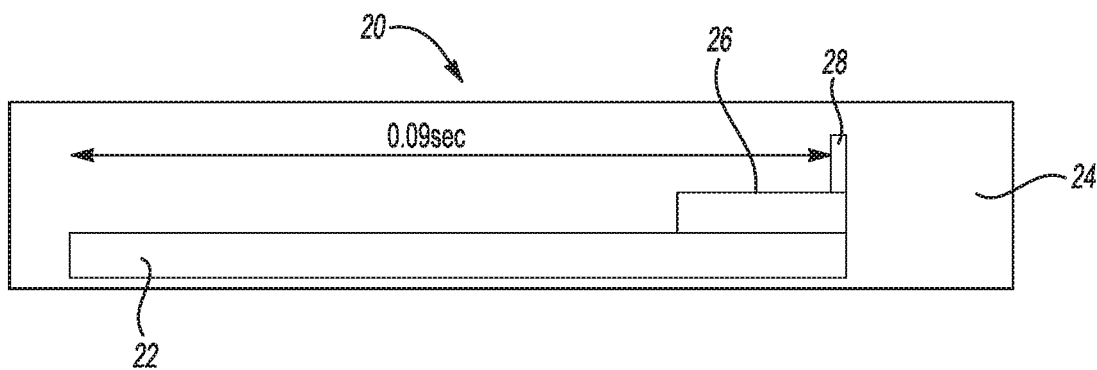
FIG. 2 is a schematic of a printing scheme used to determine recovery/start up for fixer pens, according to an example.

FIG. 2 illustrates an example Uncapped Test file 20 that was printed for a recovery/start up test. A first bar 22 of pre-treatment fixing fluid was printed on an offset coated medium 24 as a 1200 dpn (dots per nozzle) "spit" after a 6 minute delay during which the fixer pen is left uncapped. A second bar 26 of pre-treatment fixing fluid was printed on the offset coated medium 24 as a 200 dpn spit. A third bar

TABLE I

| Example | Ca Pro, wt % | Ca Pan., wt % | Ca Nitrate, wt % | SE-F | GA 211 | Solvent | Biocide 1 | Biocide 2 |
|---|---|---|---|---|---|---|---|---|
| 1 (Comp) | 2.9 | 4.8 | 4.57 | 0.16 | — | Gly: 12 | GXL: 0.1 | B20: 0.2 |
| 2 (Comp) | 2.61 | 4.32 | 4.11 | 0.14 | — | Gly: 10.8 | GXL: 0.09 | B20: 0.18 |
| 3 (Comp) | 2.61 | 4.32 | 4.11 | 0.14 | — | 4EG: 10.8 | GXL: 0.09 | B20: 0.18 |
| 4 (Comp) | 0 | 4.0 | 4.0 | 0.12 | 0.05 | 4EG: 12 | M20: 0.07 | B20: 0.2 |
| 5 (Comp) | 2.9 | 1.0 | 4.0 | 0.12 | 0.05 | 4EG: 12 | M20: 0.07 | B20: 0.2 |
| 6 (Example) | 2.8 | 0 | 8.0 | 0.12 | 0.05 | 4EG: 12 | M20: 0.07 | B20: 0.2 |
| 7 (Example) | 2.8 | 0 | 8.0 | 0.12 | 0.05 | 4EG: 14 | M20: 0.07 | B20: 0.2 |
| 8 (Comp) | 2.8 | 0 | 8.0 | 0.12 | 0.05 | Gly: 12 | M20: 0.07 | B20: 0.2 |
| 9 (Comp) | 2.8 | 0 | 8.0 | 0.12 | 0.05 | Dant: 12 | M20: 0.07 | B20: 0.2 |

Comparative Examples 1-5 all included calcium pantothenate and are considered to be outside the scope of the teachings. It is noted that in Comparative Example 4, calcium propionate was omitted, to see if its absence would lead to an improvement in the properties of the pre-treatment fixing fluid. In Comparative Example 5, the concentration of calcium pantothenate was reduced (while keeping the concentration of calcium nitrate approximately the same as Comparative Examples 1-4), to see if a lower calcium pantothenate would lead to an improvement in the properties of the pre-treatment fixing fluid.

Examples 6 and 7 omitted the calcium pantothenate, as well as increased the calcium nitrate concentration and also included two surfactants, one having an HLB value within 28 of pre-treatment fixing fluid was printed on the offset coated medium 24 as a 22 dpn spit. The third bar 28 was printed 0.09 seconds after the start of printing the first bar 24. After the third bar 28, actual printing commences. As such, the goal is to achieve a fully recovered first line after the 22 dpn spit bar. Missing the smallest spit bar 28 and the lines after it meant that the fixer pen was not able to recover. For the 22 dpn spit, any number of missed drops less than 21 is acceptable, because this indicates pen recovery.

Table II lists the observed results of printing the Uncapped Test file 20 for the nine pre-treatment fixing fluid compositions. Table IV shows the number of missed drops for Examples 6 and 7 which had the 22 dpn spit bar printed.

TABLE II

| Example | 22 dpn Spit Bar Printed? | Comments |
|---|---|---|
| 1 (Comp) | No | Fixer pen did not recover when left uncapped for 6 minutes in printhead. The tinted fixer print was streaky and nozzle health was poor. |
| 2 (Comp) | No | Fixer pen did not recover when left uncapped for 6 minutes in printhead. A very streaky tinted fixer print showed the nozzle health was not good. |
| 3 (Comp) | No | The tinted fixer print was not streaky; however, the fixer pen did not recover when left uncapped for 6 minutes in printhead. |
| 4 (Comp) | No | Elimination of calcium propionate was not helpful for pen recovery when left uncapped for 6 minutes in printhead. |
| 5 (Comp) | No | Evan a small quantity of calcium pantothenate in the pre-treatment fixing formulation caused the nozzle health issue. |
| 6 (Example) | Yes | The tinted fixer print indicated an excellent pen recovery when left uncapped for more than 6 minutes in printhead. |
| 7 (Example) | Yes | The tinted fixer print was a little streaky, but indicated pen recovery when left uncapped for more than 6 minutes in printhead. The higher solvent amount (14%) and higher viscosity (1.9 centipoises (cP)) (than example 6, 12% co-solvent and viscosity of 1.7 cP) may have led to the streakiness. |
| 8 (Comp) | No | Fixer pen did not recover when left uncapped for 6 minutes in printhead. |
| 9 (Comp) | No | Fixer pen did not recover when left uncapped for 6 minutes in printhead. |

It is clear from an inspection of Table II that the combination of (1) eliminating the use of calcium pantothenate and increasing the concentration of calcium nitrate and (2) employing two surfactants, one having an HLB value within a hydrophobic range and the other having a second HLB value either within a water dispersible range, results in improved decap time for the pre-treatment fixing fluid.

To test bleed, a swath of black ink was printed on an offset coated medium between two swaths of cyan ink, using the pre-treatment fixing fluid of each of Comparative Examples 1-5 and Examples 6 and 7. The pre-treatment fixing fluid was printed on the medium, and while wet, the inks were printed thereon. The mixing of two dissimilar colors in two adjacent printed dots before they dry and absorb in a substrate is referred to as color bleeding. Color bleeding reduces print quality. The color bleed results are depicted in FIGS. 3A-9A. The middle swath was black ink, while the two outer swaths were cyan ink. The results are summarized in Table III.

To test printed text quality, the color (black or cyan) was printed on an offset coating medium, using the pre-treatment fixing fluid of each of Comparative Examples 1-5 and Examples 6 and 7. The pre-treatment fixing fluid was printed on the medium, and while wet, the inks were printed thereon. The text quality results are depicted in FIGS. 3B-9B. The left image ("1") was of black ink printed on the respective pre-treatment fixing fluid, while the right image ("2") was of cyan ink printed on the respective pre-treatment fixing fluid. The results are summarized in Table III.

TABLE III

| | Bleed | | Text Quality | |
|---|---|---|---|---|
| Example | Comments | FIG. | Comments | FIG. |
| 1 (Comp) | Bad control on bleed | 3A | Text quality not great | 3B |
| 2 (Comp) | Decent control on bleed | 4A | Text quality not good for cyan | 4B |
| 3 (Comp) | Decent control on bleed | 5A | Text quality not good for cyan | 5B |
| 4 (Comp) | Bad control on bleed | 6A | Text quality good for both colors | 6B |
| 5 (Comp) | Good control on bleed | 7A | Text quality good for both colors | 7B |
| 6 (Example) | Good control on bleed | 8A | Text quality good for both colors | 8B |
| 7 (Example) | Good control on bleed | 9A | Text quality good for both colors | 9B |

Although not shown in Tables II and III, the formulation of Comparative Example 1 became hazy over time and it was not a clear solution.

The text quality was good for Comparative Examples 4 and 5 and Examples 6 and 7, as evidenced by FIGS. 6B-9B. However, other factors, such as bleed (Comparative Example 4) and nozzle health (Comparative Example 5) were undesirable.

In other observations, comparing the results of Comparative Examples 1, 2, 8 and 9 and Examples 6 and 7 indicates that tetraethylene glycol (4EG) is a better solvent than glycerol or DANTOCOL® DHE for calcium salts. Tetraethylene glycol may perform as a chelating agent, which can increase the calcium salt solubility and keep the pen healthier. As shown in Table II, the fixer pen did not recover when left uncapped for 6 minutes in printhead for Comparative Examples 1, 2, 8, and 9. While the data is not shown, essentially the same results were obtained with co-solvents 1,3,5-pentanetriol and polypropylene glycol in place of tetraethylene glycol.

Figure 10A:
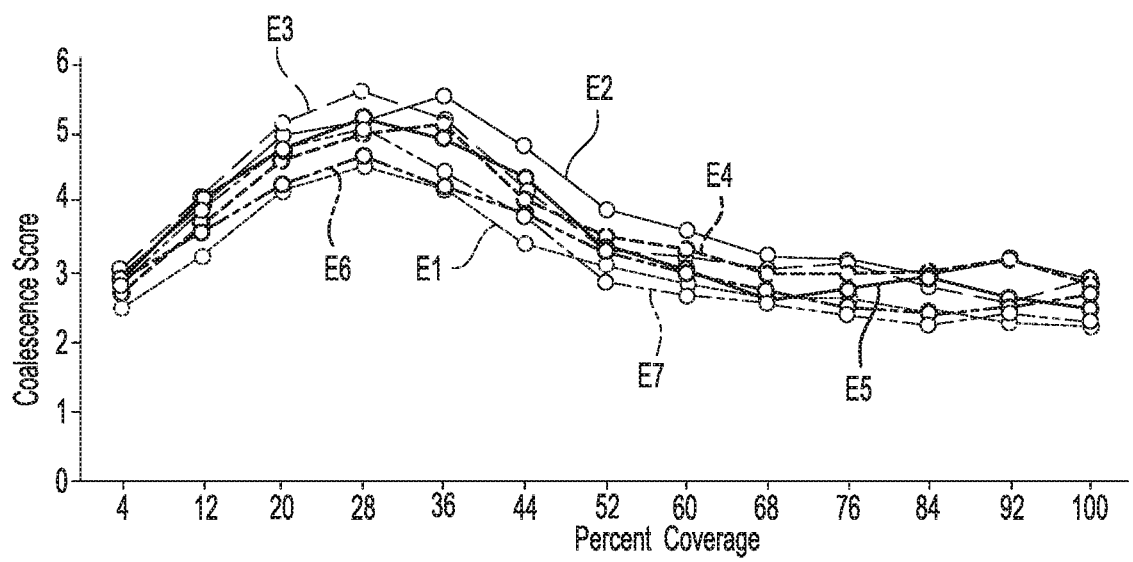
FIGS. 10A and 10B are each a plot on coordinates of a coalescence score (Y-axis) and percent ink coverage (X-axis) of the coalescence of black inks (FIG. 10A) and cyan inks (FIG. 10B) containing different surfactant combinations, according to examples.
Figure 10B:
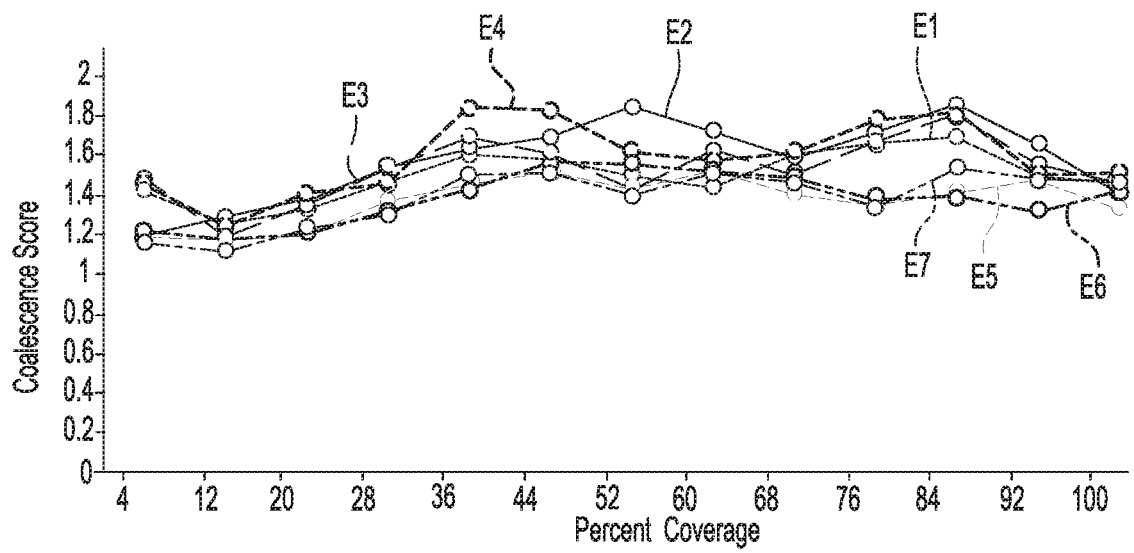

Finally, coalescence of black and cyan inks printed on the pre-treatment fixing fluids of Comparative Examples 1-5 and Examples 6 and 7 was measured and plotted. The coalescence was measured by printing an ink on the pre-treatment fixing fluid on an offset coated medium in a series of squares, ranging from 4% coverage to 100% coverage (X-axis of FIGS. 10A and 10B). A scanner was used to measure the white space in each square. An algorithm translated the optical measurement to a coalescence score (Y-axis of FIGS. 10A and 10B). A relatively higher score is indicative of poor coalescence. The results are depicted in FIG. 10A (for black ink) and FIG. 10B (for cyan ink).

In both plots, Comparative Examples 1-5, Example 6, and Example 7 are denoted by Curves E1-E7, respectively. The curves show that the pre-treatment fixing fluid of Example 6 had an overall better control on coalescence than the other pre-treatment fixing fluids. This is evidenced by inspecting those portions of the curves above the threshold of 4 for black or closer to the threshold of 2 for cyan. Better coalescence is indicated by as much of the curve as possible being as close to 4 or below 4 for black or by as much of the curve as possible being below 2 for cyan.

In conclusion, Examples 6 and 7, with slightly less total salt (wt %) and the highest calcium ion (wt %) and tetraethylene glycol as the co-solvent, gave the best pen recovery, high text quality, and a very good bleed and coalescence control. Table IV summarizes the pen recovery results (where "NR" indicates the pen did not recover).

TABLE IV

| | Example: | | | | | | | | |
|---|---|---|---|---|---|---|---|---|---|
| | 1 | 2 | 3 | 4 | 5 | 6 | 7 | 8 | 9 |
| Missing drops until the pen recovered (from 22 drops) | NR | NR | NR | NR | NR | 5 | 9 | NR | NR |
| Total Calcium Salts | 12 | 11 | 11 | 8 | 7.9 | 10.8 | 10.8 | 10.8 | 10.8 |
| Total Calcium (%) | 1.7 | 1.6 | 1.6 | 1.01 | 1.16 | 1.96 | 1.96 | 1.96 | 1.96 |

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50 fpm to about 1000 fpm should be interpreted to include not only the explicitly recited limits of about 50 fpm to about 1000 fpm, but also to include individual values, such as 75 fpm, 900 fpm, etc., and sub-ranges, such as from about 65 fpm to about 850 fpm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A pre-treatment fixing fluid for an offset coated medium, comprising:
    calcium-containing cationic crashing agents consisting of calcium propionate and calcium nitrate, wherein the calcium propionate is present in an amount ranging from greater than 0 wt % to about 10 wt % based on a total wt % of the pre-treatment fixing fluid, and wherein the calcium nitrate is present in an amount ranging from about 15 wt % to greater than 0 wt % based on the total wt % of the pre-treatment fixing fluid;
    a co-solvent;
    a surfactant combination consisting of from about 0.05 wt % to about 1.5 wt % of a first surfactant having a first hydrophilic lipophilic balance (HLB) value within a hydrophobic range and from greater than 0 wt % to about 0.1 wt % of a second surfactant having a second HLB value within a water dispersible range; and
    a balance of water.

2. The pre-treatment fixing fluid as defined in claim 1 wherein the co-solvent is tetraethylene glycol.

3. The pre-treatment fixing fluid as defined in claim 1 wherein the first HLB value is less than about 6,and wherein the second HLB value is greater than 6.

4. The pre-treatment fixing fluid as defined in claim 1 wherein the first surfactant includes ethoxylated 2,4,7,9-tetramethyl-5-decyne-4,7-diol and wherein the second surfactant includes poly(oxy-1,2-ethanediyl), α-(nonylphenyl)-ω-hydroxy-, branched plus 2,4,7,9-tetramethyl-5-decyne-4,7-diol.

5. The pre-treatment fixing fluid as defined in claim 1, further comprising an acid present in an amount sufficient to render a pH of the pre-treatment fixing fluid from about 4.0 to about 7.0.

6. The pre-treatment fixing fluid as defined in claim 1 wherein the calcium propionate is present in an amount of about 2.8 wt %, and the calcium nitrate is present in an amount of about 8 wt % of calcium nitrate.

7. The pre-treatment fixing fluid as defined in claim 1 wherein the first surfactant is ethoxylated 2,4,7,9-tetramethyl-5-decyne-4,7-diol and is present in an amount of about 0.12 wt %, and the second surfactant is poly(oxy-1,2-ethanediyl), α-(nonylphenyl)-ω-hydroxy-, branched plus 2,4,7,9-tetramethyl-5-decyne-4,7-diol and is present in an amount of about 0.05 wt %.

8. A method for improving uncapped start up performance of an inkjet fixer pen, the method comprising:
    preparing a pre-treatment fixing fluid, including:
        calcium-containing cationic crashing agents consisting of calcium propionate and calcium nitrate, wherein the calcium propionate is present in an amount ranging from greater than 0 wt % to about 10 wt % based on a total wt % of the pre-treatment fixing fluid, and wherein the calcium nitrate is present in an amount ranging from about 15 wt % to greater than 0 wt % based on the total wt % of the pre-treatment fixing fluid, a pre-treatment fixing fluid co-solvent, a surfactant combination consisting of from about 0.05 wt % to about 1.5 wt % of a first surfactant having a first hydrophilic lipophilic balance (HLB) value within a hydrophobic range and from greater than 0 wt % to about 0.1 wt % of a second surfactant having a second HLB value within a water dispersible range, and a balance of water; and loading the pre-treatment fixing fluid into the inkjet fixer pen.

9. The method as defined in claim 8, further comprising:

allowing the inkjet fixer pen to remain uncapped for a time ranging from about 5 minutes to about 10 minutes; and after the time and without servicing the inkjet fixer pen, ejecting at least some of the pre-treatment fixing fluid from the inkjet fixer pen.

10. The method as defined in claim 8 wherein the first HLB value is less than about 6, and wherein the second HLB value is greater than 6.

11. The method as defined in claim 10 wherein the first surfactant includes ethoxylated 2,4,7,9-tetramethyl-5-decyne-4,7-diol and wherein the second surfactant includes poly(oxy-1,2-ethanediyl), α-(nonylphenyl)-ω-hydroxy-, branched plus 2,4,7,9-tetramethyl-5-decyne-4,7-diol.

12. The method as defined in claim 8 wherein the pre-treatment fixing fluid further includes an acid present in an amount sufficient to render a pH of the pre-treatment fixing fluid from about 4.0 to about 7.0.

13. A coated offset medium, comprising:

a print medium coated with a coating that contains a hydrophobic polymer and forms a nonporous smooth surface; and a pre-treatment fixing coating on the nonporous smooth surface of the coated offset medium, the pre-treatment fixing coating including:

calcium-containing cationic crashing agents consisting of calcium propionate and calcium nitrate, wherein the calcium propionate is present in an amount ranging from greater than 0 wt % to about 10 wt % based on a total wt % of the pre-treatment fixing coating, and wherein the calcium nitrate is present in an amount ranging from about 15 wt % to greater than 0 wt % based on the total wt % of the pre-treatment fixing coating, and a surfactant combination consisting of from about 0.05 wt % to about 1.5 wt % of a first surfactant having a first hydrophilic lipophilic balance (HLB) value within a hydrophobic range and from greater than 0 wt % to about 0.1 wt % of a second surfactant having a second HLB value within a water dispersible range.

14. The coated offset media as defined in claim 13 wherein the first HLB value is less than about 6, and wherein the second HLB value is greater than 6.

15. The coated offset media as defined in claim 14 wherein the first surfactant includes ethoxylated 2,4,7,9-tetramethyl-5-decyne-4,7-diol and wherein the second surfactant includes poly(oxy-1,2-ethanediyl), α-(nonylphenyl)-ω-hydroxy-, branched plus 2,4,7,9-tetramethyl-5-decyne-4,7-diol.

16. The coated offset media as defined in claim 13 wherein the pre-treatment fixing coating further includes an acid.

17. The coated offset media as defined in claim 13, further comprising an ink printed on the pre-treatment fixing coating, wherein the ink includes:

water;

a colorant;

a binder;

a co-solvent; and a surfactant.

* * * * *